US005667188A

United States Patent [19]

Bettinsoli

[11] Patent Number: 5,667,188

[45] Date of Patent: Sep. 16, 1997

[54] MOUNTING STRUCTURE FOR LAMPS, STREET LAMPS AND SIMILAR DEVICES

[75] Inventor: Emidio Bettinsoli, Lodrino, Italy

[73] Assignee: Garden Light, S.R.L., Italy

[21] Appl. No.: 349,311

[22] Filed: Dec. 5, 1994

[30] Foreign Application Priority Data

May 31, 1994 [IT] Italy ................................ MI940389 U

[51] Int. Cl.$^6$ .................................................. F16M 13/00

[52] U.S. Cl. .................. 248/558; 248/218.4; 248/219.2; 248/219.4; 248/220.21; 248/222.51; 248/224.8; 248/911; 248/912

[58] Field of Search ................................ 248/121, 125.7, 248/200, 218.4, 219.2, 219.4, 289.11, 911, 912, 126, 220.21, 222.51, 224.8, 558

[56] References Cited

U.S. PATENT DOCUMENTS

| | | | |
|---|---|---|---|
| 352,191 | 11/1886 | Jeffery | 248/220.21 |
| 1,095,323 | 5/1914 | Fowler | 248/222.51 X |
| 1,183,460 | 5/1916 | Hjorth | 248/220.21 |
| 1,750,171 | 3/1930 | Goldstone | 248/222.51 X |
| 2,750,142 | 6/1956 | McKee | 248/222.51 X |
| 3,115,435 | 12/1963 | Abramson | 248/222.51 X |
| 3,268,252 | 8/1966 | Rolland | 248/218.4 X |
| 3,817,394 | 6/1974 | Saiki | 248/218.4 X |
| 3,874,623 | 4/1975 | Moulton | 248/121 |
| 4,156,272 | 5/1979 | Wandler | 248/219.4 X |
| 4,618,114 | 10/1986 | McFarland | 248/220.21 X |
| 5,156,110 | 10/1992 | Fuller | 248/912 X |
| 5,184,911 | 2/1993 | Wu | 248/912 X |
| 5,275,268 | 1/1994 | Hall et al. | 248/218.4 |
| 5,386,961 | 2/1995 | Lu | 248/911 X |
| 5,398,900 | 3/1995 | Schober | 248/206.5 X |
| 5,462,247 | 10/1995 | Aldrich | 248/218.4 X |

FOREIGN PATENT DOCUMENTS

| | | | |
|---|---|---|---|
| 1314618 | 12/1962 | France | 248/220.21 |
| 423290 | 12/1925 | Germany | 248/220.21 |

*Primary Examiner*—Leslie A. Braun
*Assistant Examiner*—Richard M. Smith
*Attorney, Agent, or Firm*—Laff, Whitesel, Conte & Saret, Ltd.

[57] ABSTRACT

A mounting structure for lamps, street lamps and the like comprises a lamp supporting arm, an attachment device for connection of the arm to the structure and means for removably engaging the arm to the attachment device, which attachment device is selectable from a plurality of attachment devices comprising at least one type (3*a*) for wall fitting (3*a*) and at least one type (3*b*) for connection to a columnar post.

5 Claims, 7 Drawing Sheets

MOUNTING STRUCTURE FOR LAMPS, STREET LAMPS AND SIMILAR DEVICES

BACKGROUND OF THE INVENTION

1. Field of the Invention

The present invention relates to a mounting structure for lamps, street lamps and similar devices.

2. Prior Art

It is known that mounting structures for lamps, street lamps and similar lighting bodies, particularly used for lighting open places such as gardens and terraces, are generally comprised of one or more supporting arms for mounting of the lamps. Depending on requirements, such supporting arms are designed and manufactured according to several different conformations and styles, not only for aesthetical reasons but also for the purpose of complying with the intended uses.

For example, one type of mounting structure consists of a wall fitting, in which the supporting arm is intended for engagement with a wall at a base portion thereof and extends away from said base portion. Another type of mounting structure is adapted for connection to columnar posts, that is tubular elements or standards. In the last mentioned application more supporting arms may be for example provided and they may extend in different radial directions starting from the columnar post.

Practically, in the case both of wall lamps and lamps supported by a columnar post, the mounting structures are of one piece construction, that is they comprise both the true supporting arm and an attachment device which is differently shaped and designed, depending on the intended application. Alternatively, a mounting structure consisting of two separate pieces, that is the arm and the attachment device, may be provided and in this case it is necessary to plan and manufacture first types of arms and attachment devices for wall fitting and second types of arms and attachment devices for fitting to columnar posts.

In other words, the chief limit in mounting structures of known type is exactly recognizable in the absence of adaptability, in that a lamp supporting arm designed for wall fitting is inadaptable for attachment to a columnar post and, on the other hand, a supporting arm for fitting to a columnar post cannot be used for a wall lamp. Due to said absence of adaptability of the supporting arm, high additional production costs are obviously involved because a manufacturer intending to supply mounting structures for both the above uses is obliged not only to design and make two distinct types of supporting arms but also to keep them in stock. In addition, the supporting arms and attachment devices of known type for both uses often cannot be easily and readily assembled, but rather complicated mounting operations are required which sometimes cannot be directly executed by the user itself.

SUMMARY OF THE INVENTION

Under this situation, the main task of the present invention is to devise a mounting structure for lamps, street lamps and similar devices, capable of obviating the above shortcomings.

Within the scope of said main task it is an important object of the present invention to devise a mounting structure comprising modular, elements that is elements capable of use both for wall fitting and connection to columnar posts.

Another important object of the invention is to devise a mounting structure adapted to be readily and easily assembled, directly on place as well.

The objects specified are substantially achieved by a mounting structure for lamps, street lamps and similar devices including an arm for supporting said lamp, wherein said structure comprises an attachment device for connection of said arm to the structure, and means for removably engaging said arm and said attachment device, and wherein said engagement means is adapted to make said arm integral with an attachment device to be selected from a plurality of attachment devices comprising at least one first type of attachment device for wall fitting and at least one second type of attachment device for connection to a columnar post.

BRIEF DESCRIPTION OF THE DRAWINGS

A description of a preferred embodiment of a mounting structure for lamps according to the invention is now given by way of non-limiting example with the aid of the accompanying drawings, in which.

DESCRIPTION OF THE PREFERRED EMBODIMENT

Figure 1:
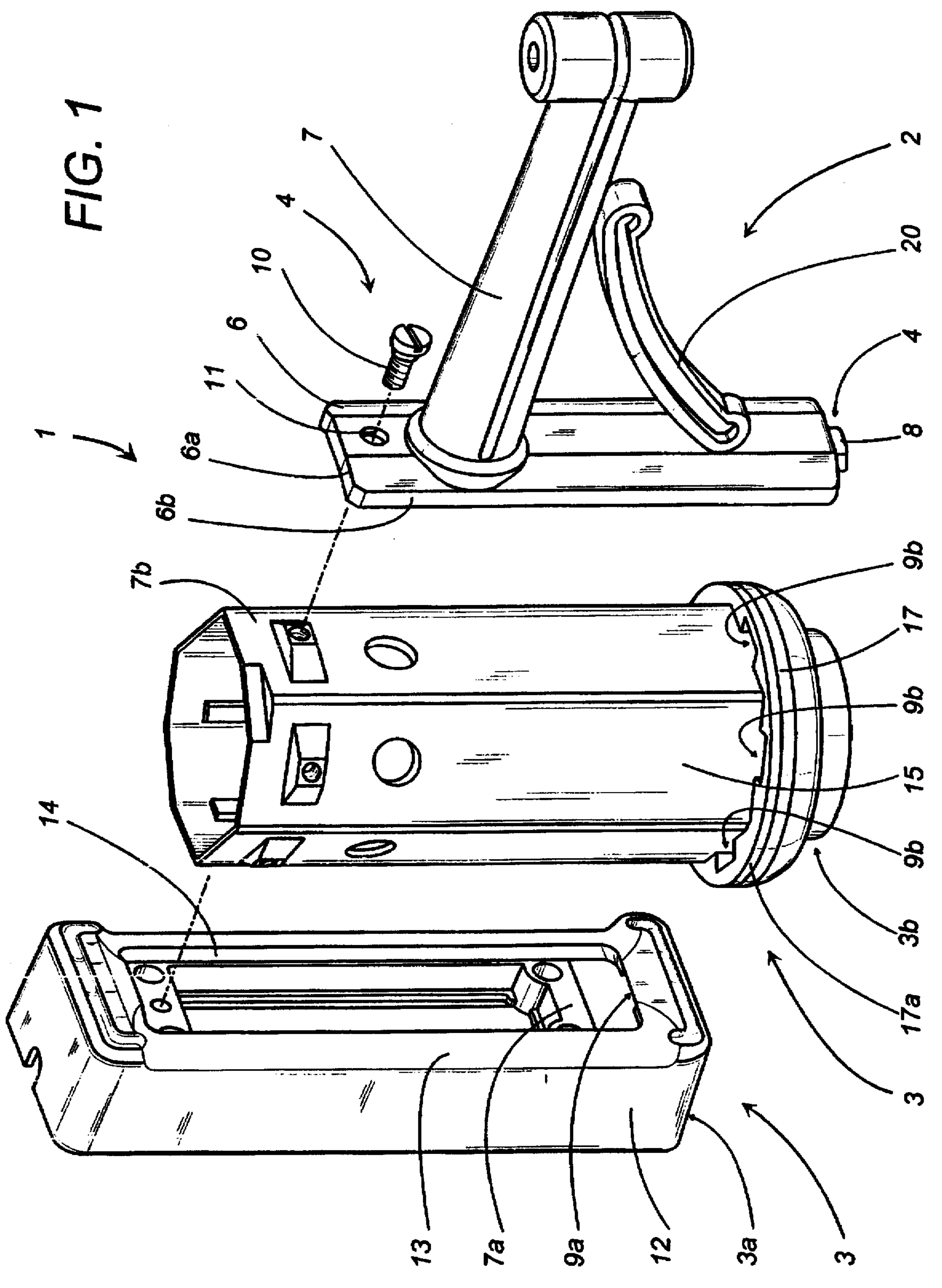
FIG. 1 is an exploded perspective view of a mounting structure according to the invention, comprising a first type of attachment device for wall fitting and a second type of attachment device for connection to a columnar posts according to a first solution.

Referring to the drawings, the mounting structure according to the invention has been generally identified by reference numeral 1.

It comprises a supporting arm 2 to the terminal end of which a lamp or a lamp street of any type can be connected, and an attachment device 3 adapted to be fixedly fastened to the supporting arm 2 itself by removable-engagement means 4. In an original manner, said engagement means is adapted to make the supporting arm 2 integral with an attachment device 3 to be selected, depending on requirements and practical uses, from a plurality of attachment devices comprising at least one type of attachment devices 3*a* for wall fitting, that is adapted to be fastened to a wall, and at least one type of attachment devices 3*b* for a columnar post 5, that is adapted to be fastened to a standard or pole in turn anchored to the ground.

More particularly, the supporting arm 2 is comprised of a base portion 6 from which a crosspiece 7 extends which is adapted to engage a lamp at the end and can be optionally stiffened by a strut 20.

The base portion 6 has a contact face 6*a* the shape of which matches at least partly that of a corresponding resting and connecting area, 7*a* and 7*b*, for the first type of attachment device 3*a* and the second type of attachment device 3*b*, respectively.

The removable-engagement means 4 comprises an end lug 8 projecting from one end of the base portion 6 and adapted to be fitted in a corresponding hollow seat 9a or 9b formed for the first attachment device 3a and second attachment device 3b respectively, as well as a screw-threaded connecting element 10 to be inserted in a through hole 11 located close to a second end of the base portion 6 and adapted to keep the face 6a against the resting and connecting area 7a or 7b, in cooperation with the end lug 8.

The attachment device for wall fitting 3a shown in FIGS. 1–4 comprises a box-shaped body 12 exhibiting a main face 13 provided with a recessed portion defining the resting and connecting area 7a. Preferably said area has a rim 14 surrounding in relief the area itself and terminating flush with the main face 13. The shape of said rim 14 matches time shape of an edge band 6b of the base portion 6, so that the latter can be housed in the resting and connecting area 7a without projecting from the main face 13, that is aligned and completely embedded in time attachment device 3a (see FIG. 4, in particular). The hollow seat 9a is formed in the rim 14, for example at its side adapted to be disposed at a lower position.

Figure 2:
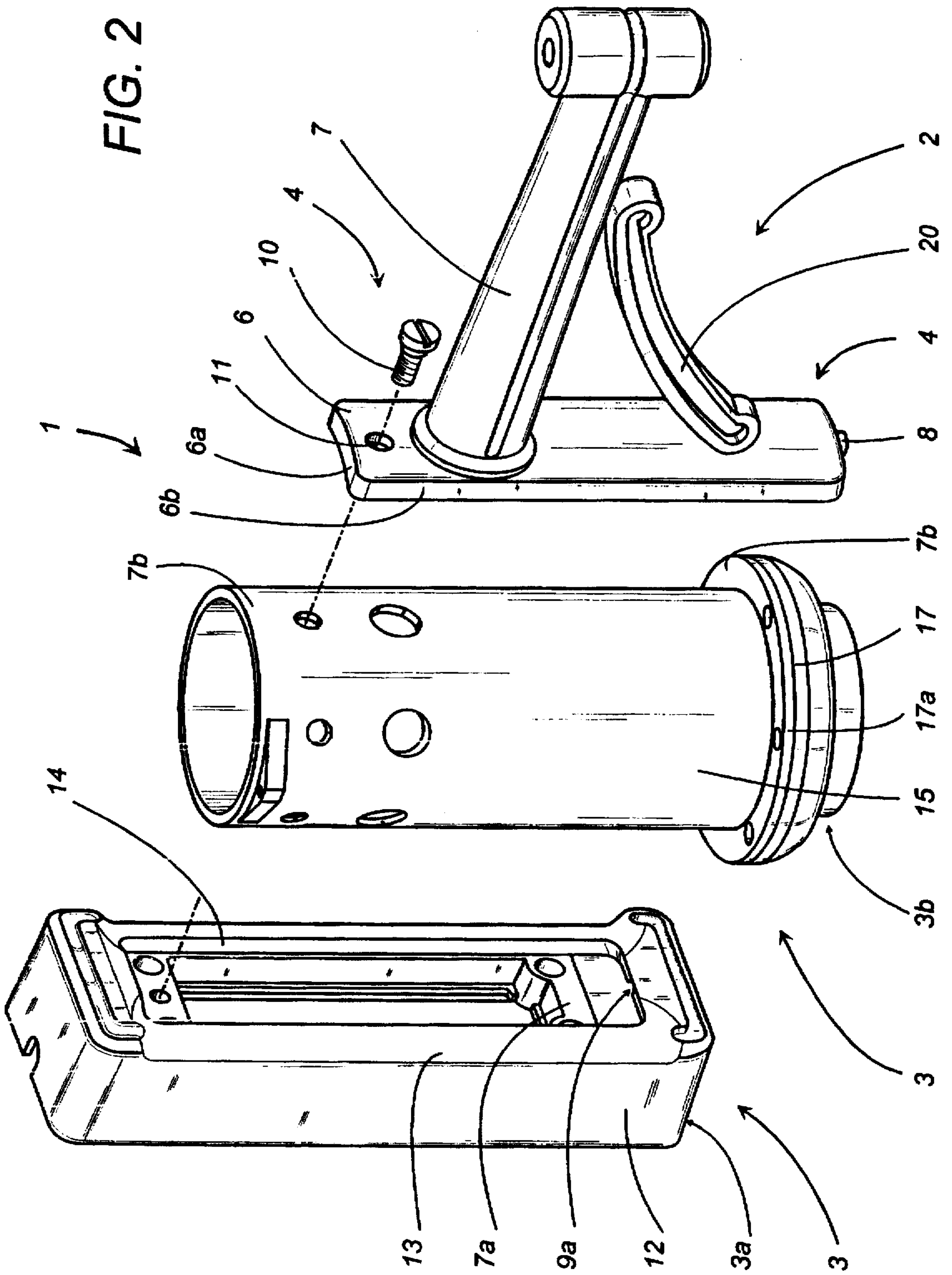
FIG. 2 is a view similar to that of FIG. 1 in which however thee second type of attachment device is made according to a second solution.
Figure 3:
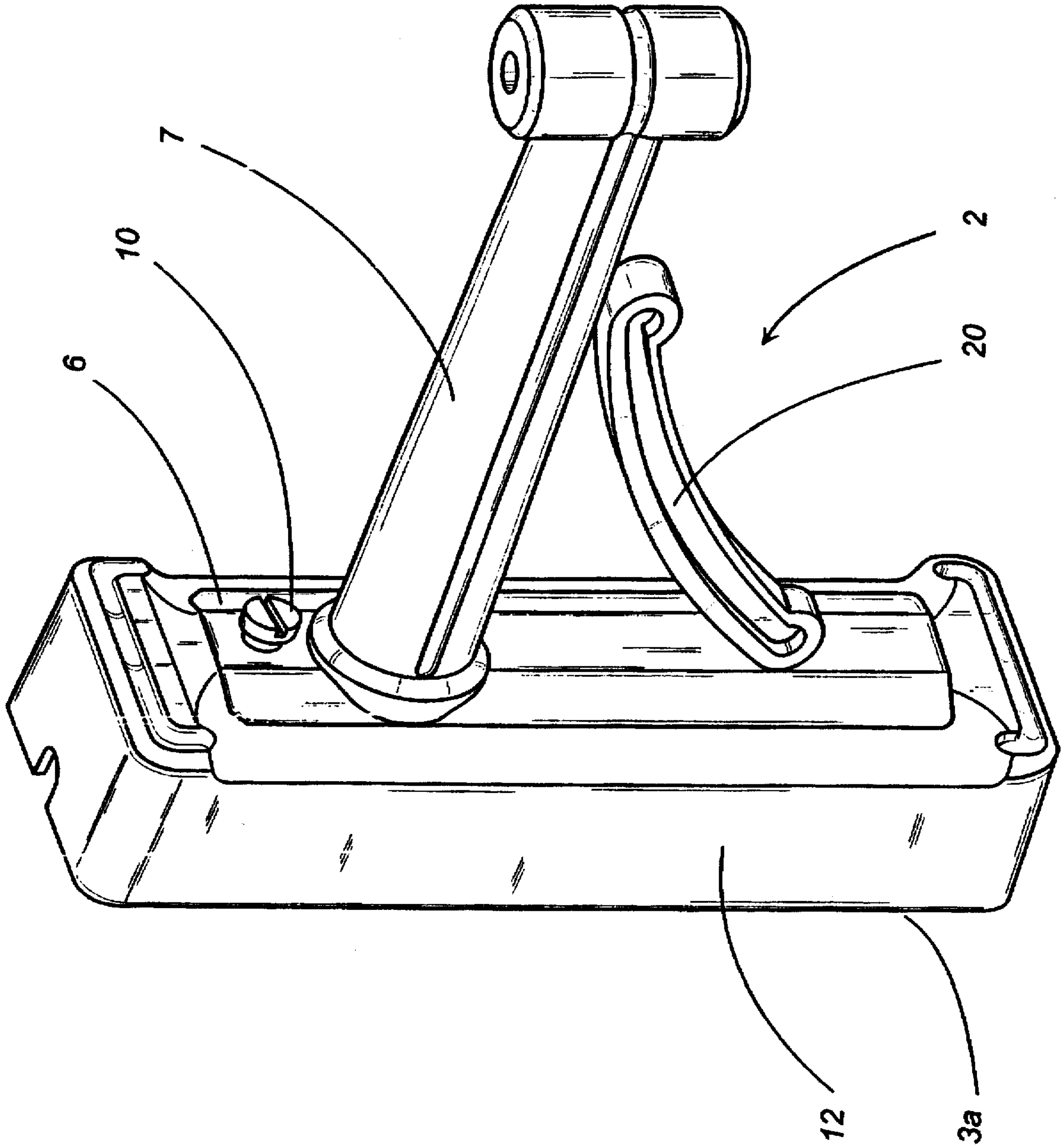
FIG. 3 is a perspective view of a mounting structure for wall fitting.
Figure 4:
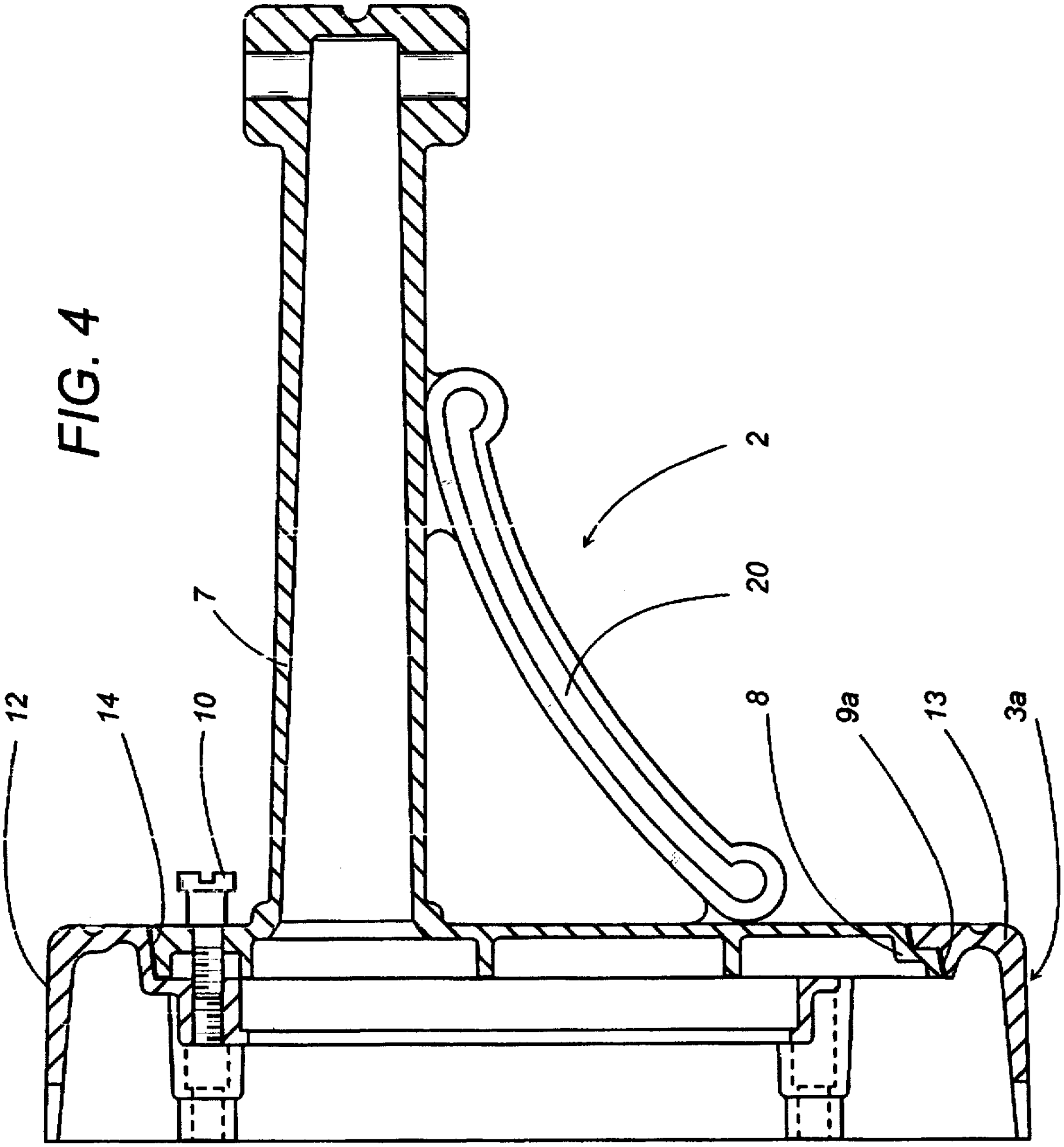
FIG. 4 is a longitudinal sectional view of the mounting structure shown in FIG. 3.
Figure 5:
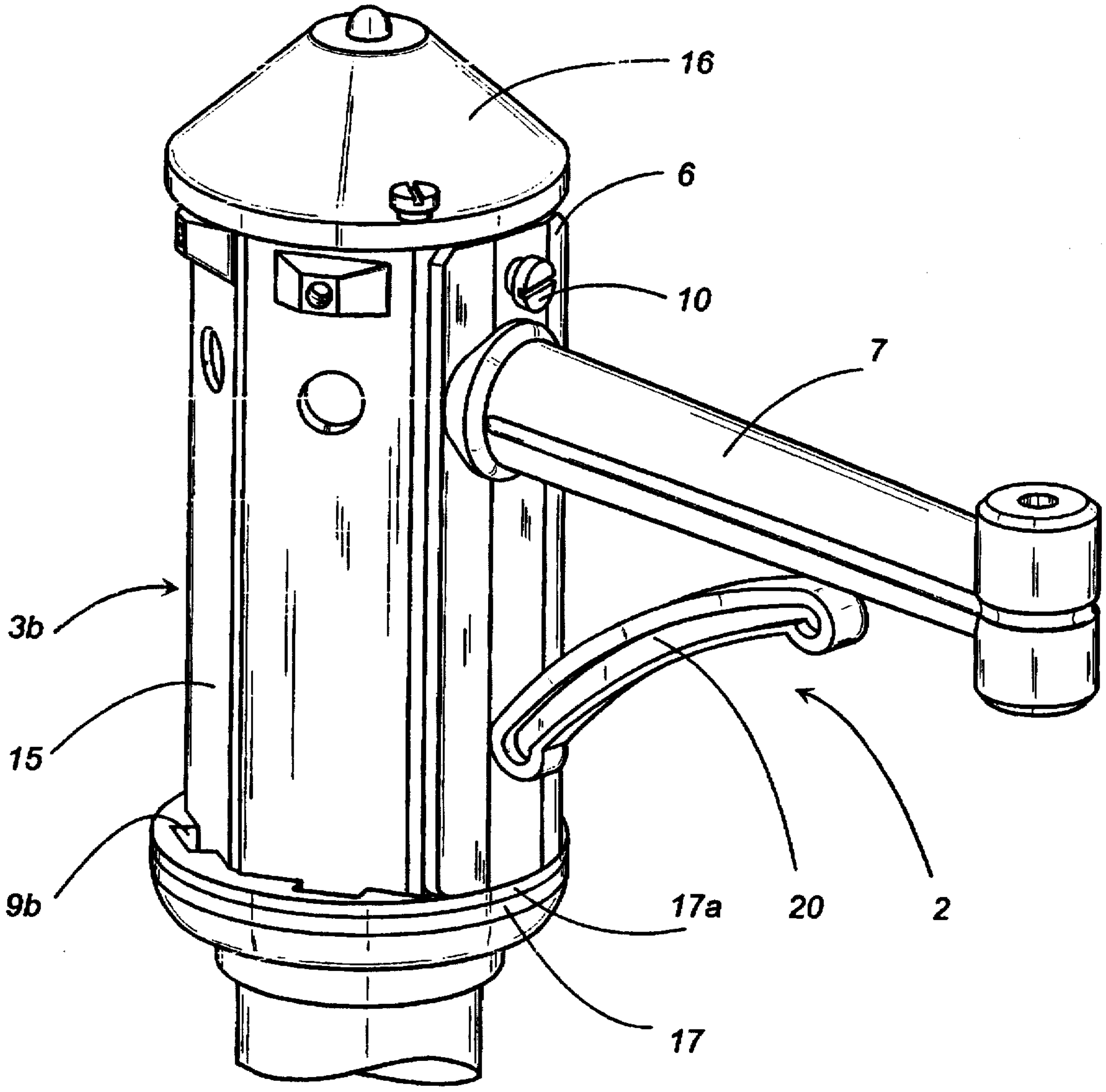
FIG. 5 is a perspective view of a mounting structure for fastening to a columnar post.
Figure 6:
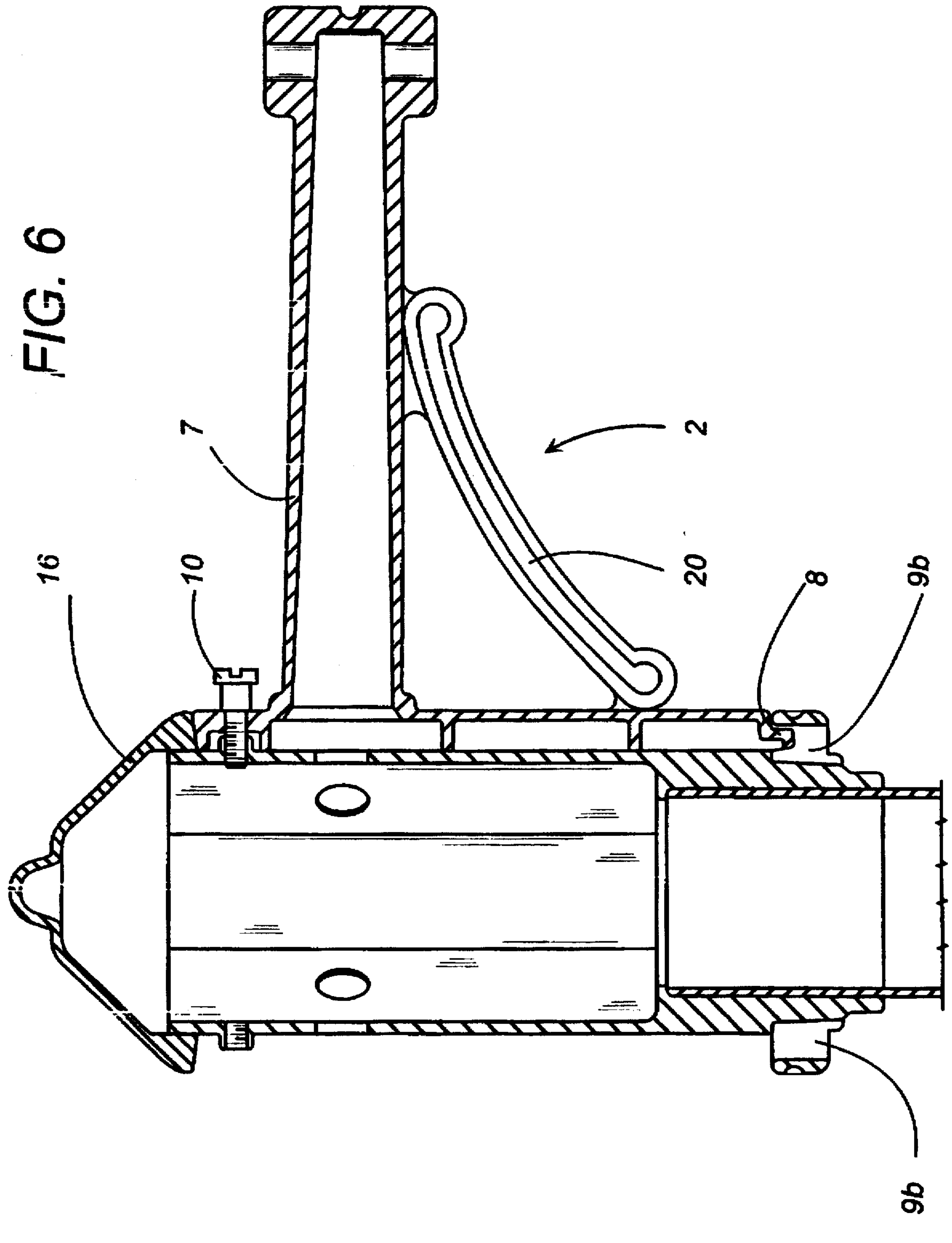
FIG. 6 is a longitudinal section of the structure shown in FIG. 5.
Figure 7:
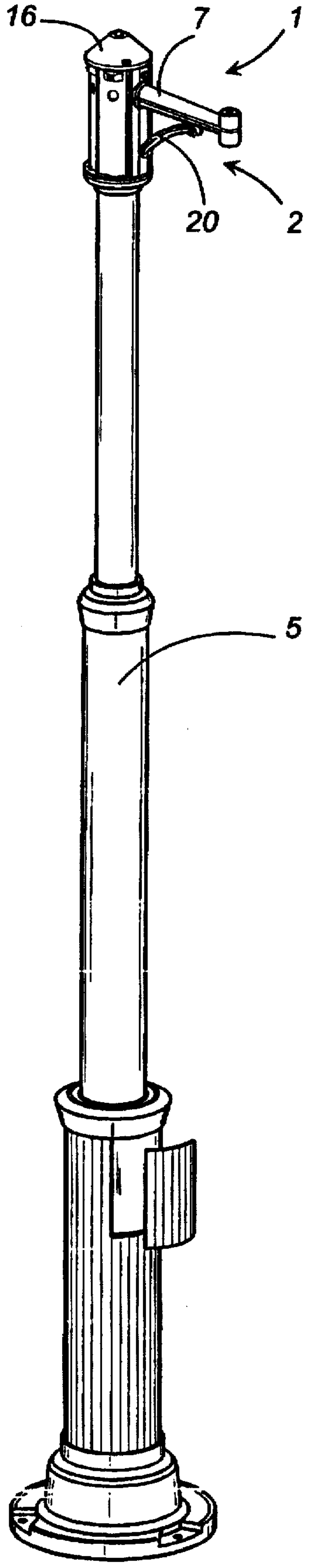
FIG. 7 shows the mounting structure of FIG. 4 applied to a columnar post.

The attachment device 3b for a columnar post, that is of the above mentioned second type, comprises a substantially tubular base body 15 the shape of which matches at least partly time shape of a length of the corresponding columnar post 5. The base body 5 may have a transverse section of polygonal (hexagonal, for example) configuration, as shown in FIGS. 1, 5, 6 and 7, or a circular configuration, as shown in FIG. 2. Where said base body is time terminal element of the columnar post 5, it may be provided on top with a cover.

In both embodiments of the base body 15, an expansion 17 substantially in the form of an annulus, that is a flange, is provided. It it integral with the base body 15 and projects outwardly close to an end designed to be disposed lowermost.

The expansion 17 and base body 15 in cooperation with each other define at least one resting and connecting area 7b for the base portion 6. For example, in the case of a base body 15 of a hexagonal configuration, each face thereof is provided to delimit a resting area 7b of its own so that the supporting arm 2 can be applied to anyone of said faces and at the same time several supporting arms 2 can be connected to the same attachment device.

In the case of a base body 15 having a circular configuration, the resting areas 7b can be defined by portions or lengths of the cylindrical outer surface of said body. Also formed in the expansion 17 are the hollow seats 9b with which the end lug 8 of arm 2 comes into engagement. There are as many hollow seats 9b as there are resting and connecting areas 7b. In addition, expansion 17 emerges from the base body 15 preferably to an extent enabling the base portion 6 of arm 2 to be substantially aligned, that is flush, with the external profile 17a of said expansion.

The invention achieves important advantages.

In fact, first of all due to the design of the supporting arm and the means for engagement of same, mounting structures to be used for both wall fitting and fastening to a columnar post can be produced, on demand, by merely selecting a different attachment device. Practically, since the supporting arm and related engagement means are adaptable to different use situations, as they are modular components, a single type of supporting arm can be produced and kept in stock, which will bring about clear advantages in terms of costs.

In addition, the means for engaging the supporting arm and the attachment device involves an easy and ready use directly by the purchaser of the mounting structures as well, so that said structures can be installed immediately without any difficulties by mutually assembling the different components according to the desired shapes and combinations.

All of the details may be replaced by technically equivalent elements and the materials and sizes for putting the invention into practice may be of any type and magnitude depending on requirements.

What is claimed is:

1. A mounting apparatus for lamps and street lamps comprising:

an arm for supporting one of said lamps, said supporting arm having a base portion, a first attachment device for fitting said arm to a wall and a second attachment device for connection of said arm to a columnar post said attachment devices each having a resting and a connecting area, said base portion having a shape which matches at least partly that of said resting and connecting area, means for removably engaging said arm and said attachment devices, said means for removably engaging having an end lug, said end lug adapted to be inserted in a corresponding hollow seat formed in said attachment devices, and at least one connecting element adapted to keep said base portion of said arm against said resting and connecting area of said attachment devices, in cooperation with said end lug, said connecting element being positioned in said base portion on the opposite side relative to said end lug, said engagement means being adapted to make said arm integral with said first and second attachment devices;

said first attachment device for wall fitting comprises a box-shaped body exhibiting a main face provided with a recessed portion defining said resting and said connecting area and adapted to house said base portion of said supporting arm, so that the latter is substantially aligned with an outer surface of the main face itself, said recessed portion of said first attachment device having a rim surrounding in relief the area itself and terminating flush with said main face, the shape of said rim matching that of a perimetric band of said base portion of the arm, and wherein said hollow seat for said end lug is disposed in said rim, said second attachment device for connection to a columnar post comprises a substantially tubular base body the shape of which matches at least partly that of a length of the corresponding columnar post, and an expansion which is integral with said base body, projects outwardly therefrom, and is substantially in the form of an annulus, said base body and annulus-shaped expansion in cooperation with each other defining said resting and connecting area for said base portion of said supporting arm.

2. The structure as claimed in claim 1, wherein said annulus-shaped expansion emerges from said base body (15) such that said base portion (6) of said arm is substantially aligned with external profile of the expansion itself.

3. The structure as claimed in claim 1, wherein said annulus-shaped expansion exhibits at least one hollow seat for said end lug (8) of said arm.

4. The structure as claimed in claim 1, wherein said substantially tubular base body exhibits a transverse section of a polygonal configuration.

5. The structure as claimed in claim 1, wherein said substantially tubular base body exhibits a transverse section of a circular configuration.

* * * * *